US012661760B2

(12) United States Patent
Rattray

(10) Patent No.: US 12,661,760 B2
(45) Date of Patent: Jun. 23, 2026

(54) BIAXIAL MOTORIZED NUT RUNNER

(71) Applicant: Robert Matthew Rattray, West Lafayette, IN (US)

(72) Inventor: Robert Matthew Rattray, West Lafayette, IN (US)

(73) Assignee: Robert Rattray, West Lafayette, IN (US)

( * ) Notice: Subject to any disclaimer, the term of this patent is extended or adjusted under 35 U.S.C. 154(b) by 175 days.

(21) Appl. No.: 18/481,343

(22) Filed: Oct. 5, 2023

(65) Prior Publication Data

US 2025/0114920 A1 Apr. 10, 2025

(51) Int. Cl.
*B25B 21/00* (2006.01)

(52) U.S. Cl.
CPC .................................. *B25B 21/002* (2013.01)

(58) Field of Classification Search
None
See application file for complete search history.

(56) References Cited

U.S. PATENT DOCUMENTS 4,747,321 A * 5/1988 Hannel .................. F16H 55/18 74/440
8,197,379 B1 * 6/2012 Yin ......................... B25F 5/001 475/299
10,173,304 B2 * 1/2019 Christofilis .............. B21D 7/16
2023/0128823 A1 * 4/2023 Tucker .................... B25F 5/006 81/121.1

FOREIGN PATENT DOCUMENTS

CN 107378535 A * 11/2017 ............ B25B 11/00

* cited by examiner

*Primary Examiner* — C. A. Rivera

(57) ABSTRACT

A mechanism is provided for the driving of threaded fasteners (nuts) down a threaded rod beyond the length of a socket, using the power of an included motor controlled by a switch. The driving of nuts is accomplished by a mechanism component with a cavity of geometry corresponding to the nut and its rod; elaborate embodiments of the mechanism allow for the replacement of that component to accommodate various nuts. A method is provided for the positioning of a gear without a shaft or bushings, as well as a method of constructing that gear.

2 Claims, 3 Drawing Sheets

BIAXIAL MOTORIZED NUT RUNNER

FIELD OF THE INVENTION

This invention relates to handheld power tools (hand tools) working with threaded fasteners (nuts) and threaded rods (sometimes called "studs" or "all-threaded" rods), such a nut driver or nut runner.

BACKGROUND OF THE INVENTION

In the course of manufacturing products that contain parts held by fasteners along long, threaded rods, fasteners are often rotated until they pass most of the length of these rods, which can be considered an undesirable use of time.

A typical impact driver with a fastening socket is unable to thread the nuts beyond the depth of its socket, as the rod cannot pass through it; similarly, existing devices for tightening fasteners to a fixed torque are often inapplicable when a threaded rod protrudes from the fastener beyond the length of a socket.

Techniques and devices exist to alleviate this, including the technique of stretching an elastic belt about a nut to be turned and the output shaft of a rotary power tool, and accessories to interface with a rotary power tool (such as that of U.S. patent 20230128823), or with any rotary tool (as in U.S. Pat. Nos. 3,913,428 A and 9,950,411 B1); however, in the course of applying such techniques or operating such devices, it is often the case that the motion of the accessory or elastic along the threaded rod with cause the accessory or elastic to separate from the rotary tool.

This invention is intended to ease the motorized motion of fasteners on threaded rods by the provision of a singular hand-held motorized tool for that purpose, which can be operated single-handedly, while still allowing such conveniences as the ability to interface with threaded fasteners of various dimensions.

BRIEF SUMMARY OF THE INVENTION

In general, this invention consists of a housing, a motor, a power source for this motor, electrical conductors enabling the transfer of power from the source to the motor, an interruptor accessible outside of the housing and fastened to the conductors so as to control the transfer of power to the motor, a pinion positioned to rotate with the shaft of the motor, a gear with a different axis of rotation and a through bore within, and a housing that permits that gear to rotate about its axis without translation and maintains the relative position of the motor pinion and the through-bore gear.

In the simplest embodiments of this invention, the axis of the motor's pinion and the through-bore gear are parallel and located such that the pinion and the through-bore gear interface directly. In more complicated embodiments, intermediate gears may be present, including idler gears and beveled gears, the latter enabling the axes of rotation of the motor pinion and through-bore gear to intersect.

In the simplest embodiments of this invention, the through-bore of the through-bore gear is shaped to complement a threaded fastener, such as a hexagonal-profile through-bore or a stepped hole with a hexagonal profile and a circular through-bore to accommodate a threaded rod. In more complicated embodiments of this invention, one or more faces of the through-bore of the through-bore gear contain a mechanism for affixing any of many sockets with cavities of various dimensions shaped complementary to various fasteners and their rods.

In the simplest embodiments of this invention, the position of the through-bore gear relative to the housing is maintained by circular grooves in the housing along which a circle of cylindrically symmetrical protrusions of the through-bore gear move during operation. More complicated embodiments may accomplish the same via bushings.

In most embodiments of this invention, the housing accommodating the motor, the power source, and the switch to control motor power is elongated to act as a handle for ease of operation. In most embodiments, this housing is broken at a point to allow for replacement of the power source (e.g., a battery) upon its depletion. In the simplest embodiments of this invention, the power to the motor is controlled by a simple, single-pole, single-throw interruption switch. In more complicated embodiments, the power may be controlled by a double-pole, double-throw interruption switch, enabling reversing the polarity of the voltage supplied to the motor and thus the direction of rotation of the motor's shaft, motor's pinion, through-bore gear, and threaded fastener; a more elaborate system of power control may be present as well.

DETAILED DESCRIPTION OF THE INVENTION

The present invention consists of a mechanism to rotate a threaded fastener, such as a nut, about an axis which does not intersect the body of any mechanism component, allowing the threaded fastener to slide about a long, threaded rod. This invention is operated by a switch external in part to the housing of the mechanism.

Figure 1:
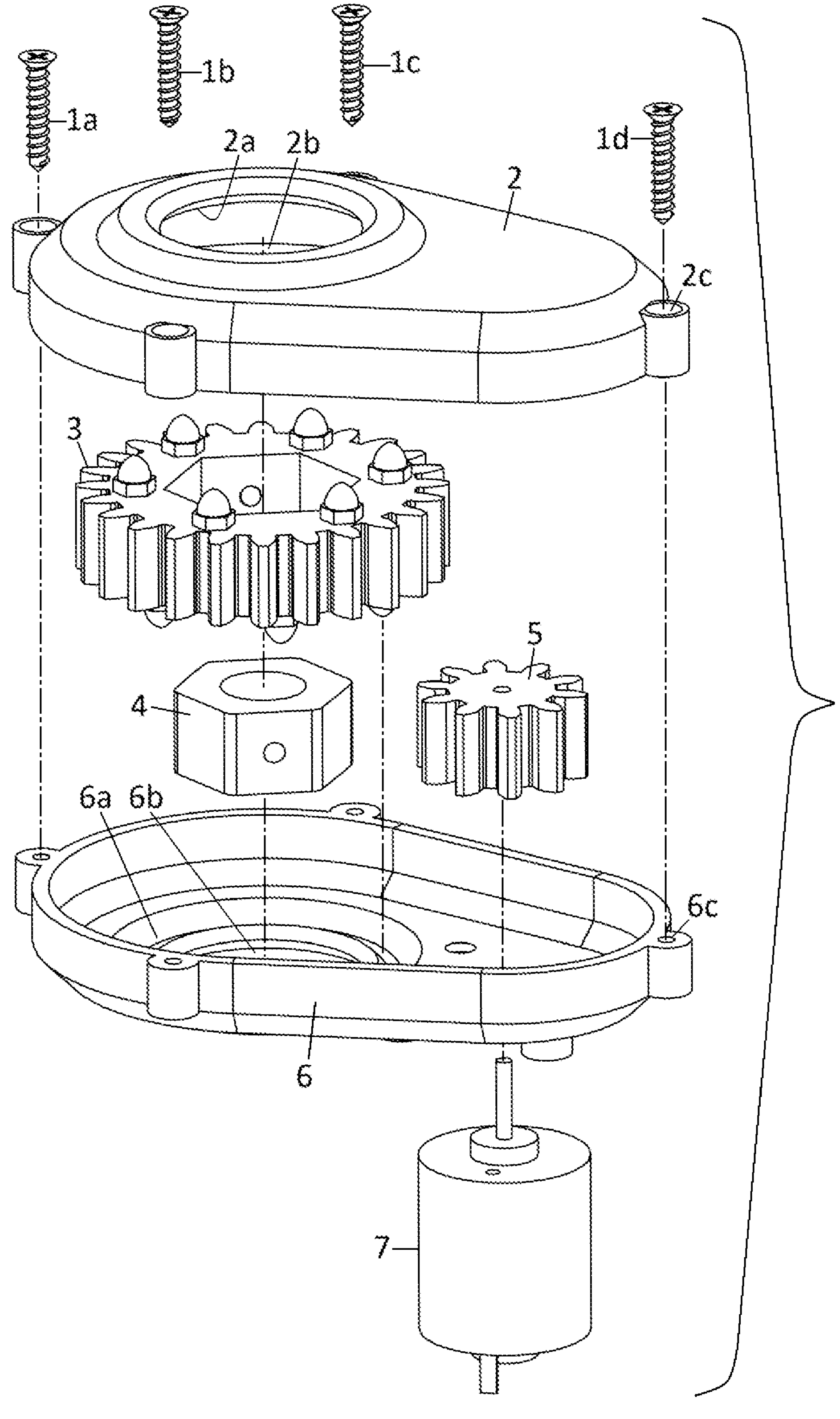
FIG. 1 is an exploded view of the mechanical portion of an embodiment of an apparatus described herein, including the housing, gears, socket, and motor.
Figure 2:
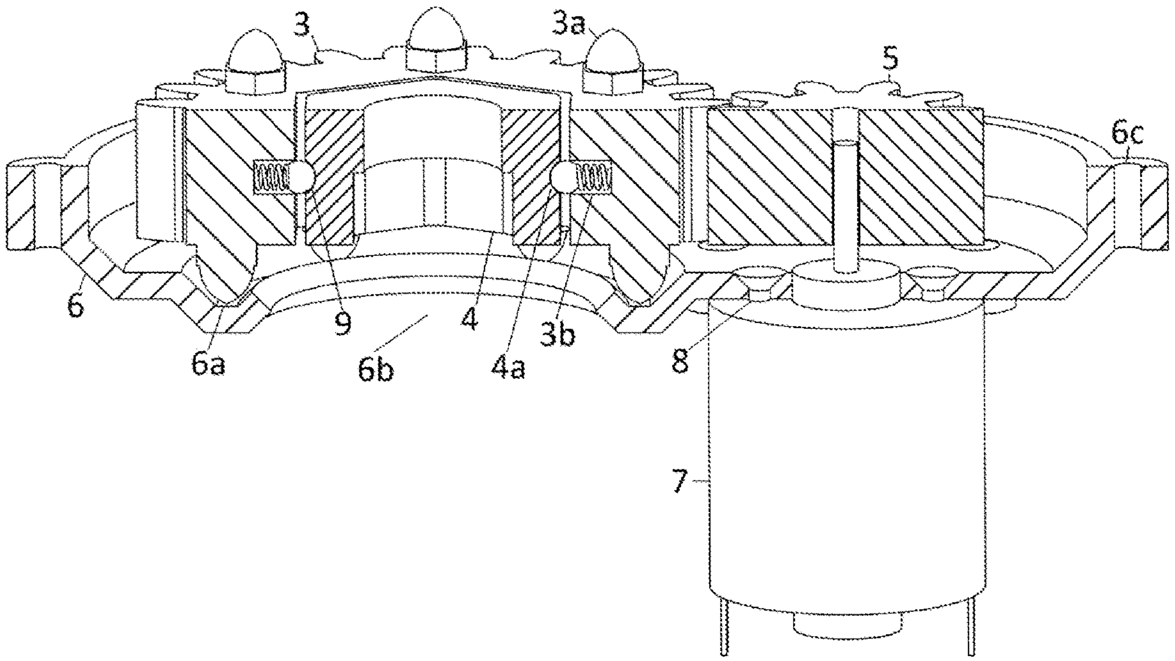
FIG. 2 is a cutaway view of the mechanical portion of the same, demonstrating the mating of mechanical parts.

Referring to FIGS. 1 and 2, the mechanical portion of a simple embodiment of the present invention consists of a motor (7), on the shaft of which is a pinion (5), depicted here as a spur gear, which interfaces with another spur gear (3) with a through-bore along its axis of rotation. More elaborate embodiments may use beveled gears for the same purpose and/or a train of gears in between these two, bevels allowing the axis of rotation of the motor and that of the through-bore gear (3) to intersect.

Depicted in FIG. 2 is a ball and spring (9) inside a cavity (3*b*) in the face of the through-bore of gear (3), which serves as a detent mechanism with a socket (4) with an exterior shape complementary to the through-bore and indentations (4*a*) enabling the ball and spring (9) to function as a detent, which may appear in embodiments of the invention. Simpler embodiments may omit the cavity (3*b*), ball and spring (9), and socket (4), in which case the surface of the through-bore of gear (3) would be shaped in a manner similar to that of the cavity of socket (4) in other embodiments of the invention. Most embodiments of the invention will include any number of sockets to serve as socket (4), of the same exterior shape and dimensions, and cavities of various shape and dimension, any of which can be removed from or placed into the through-bore of gear (3) and held by its detent mechanism. The detent mechanism may be disengaged by impediments in the motion of the threaded fastener, allowing the socket (4) to exit the rest of the apparatus and prevent damage or strain to it.

Figure 3:
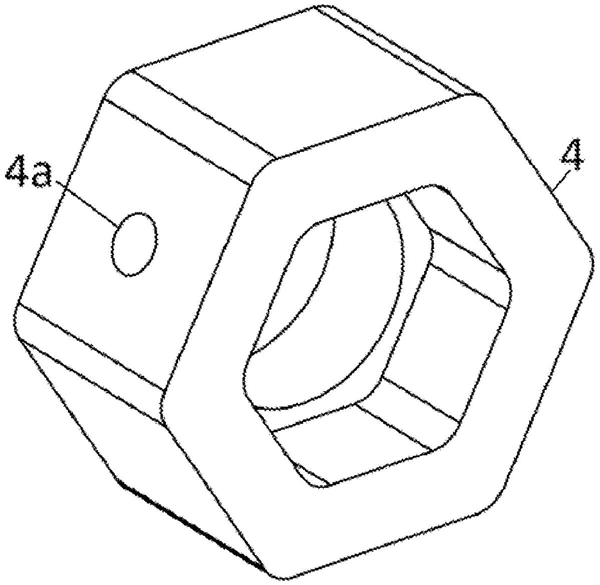
FIG. 3 is a perspective view a possible embodiment of the member of this apparatus with interfaces with threaded fasteners.

An example of an embodiment of the socket (4) is depicted in greater detail in FIG. 3; it contains a hexagonal cavity, the dimensions of which would correspond to that of a particular hexagonal threaded fastener, and a circular through-bore, the diameter of which would be more than that of a rod on which that hexagonal threaded fastener would thread. Other embodiments of the socket may have cavities of differing profile, such as a triangle (which may contact only three sides of a hexagonal fastener, and contain less material), or a square (in the case of square nuts). Other embodiments of the socket may have stepped cavities, allowing for interfacing with threaded fasteners of various dimensions.

The through-bore gear may be held within the housing by bushings of inner diameter greater than the widest diameter of its through-bore in it and in the housing, or, in simpler embodiments, in a fashion like that depicted in FIGS. 1 and 2. In such embodiments, the gear (3) includes a set of smooth, cylindrically symmetrical bumps (3*a*) arranged in a circle centered at the axis of rotation on either side of the gear, which rest in indentations of circular path (2*a*, 6*a*) in the interior of the housing on one side (2) and that on the other side (6) of the gear. The cross section of the indentation (2*a*, 6*a*) and the bumps (3*a*) may be such that they only contact at two points, minimizing friction. In all embodiments, the housing of the mechanism will require holes, as those indicated in the drawings as (2*b*) and (6*b*), through which a threaded rod may pass during operation.

Figure 4:
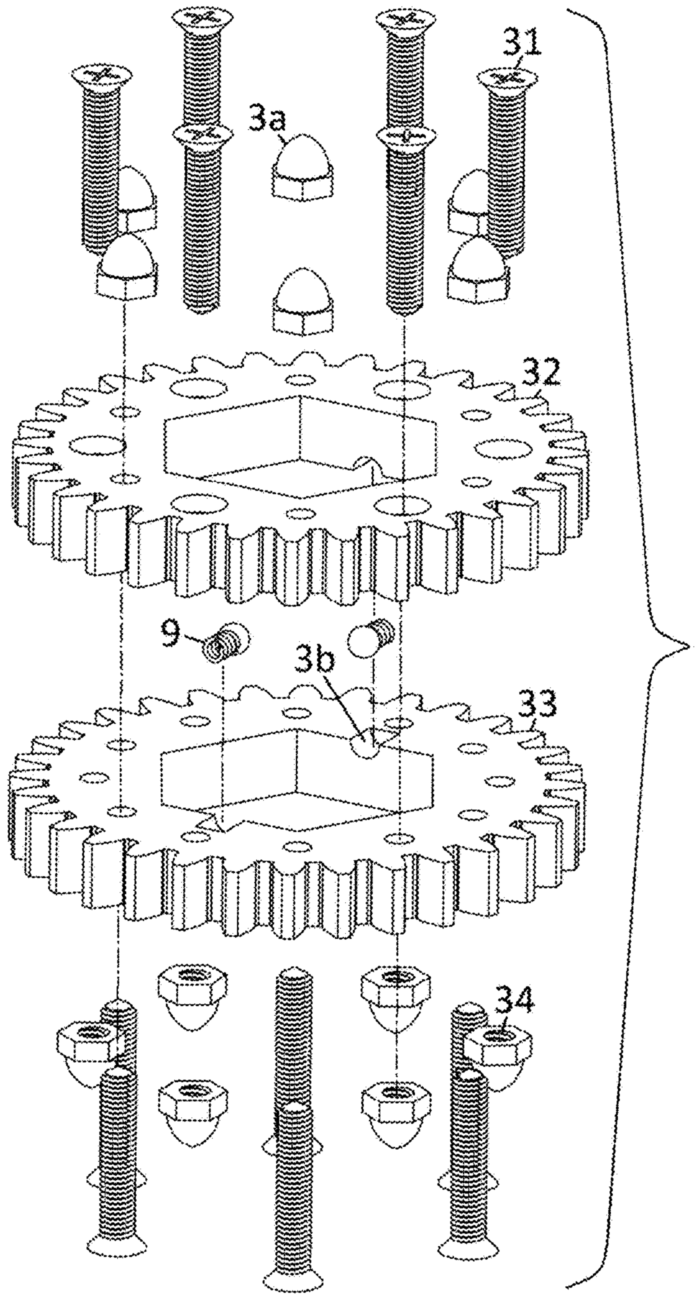
FIG. 4 is an exploded view of a possible embodiment of the peculiarly mounted component which interfaces with the contact member depicted in FIG. 3.

A method by which a gear with such bumps (3*a*) and cavity (3*b*) may be constructed is demonstrated in FIG. 4, as the combination of several smaller parts. Two of these are gears (32, 33) of approximately half the thickness of gear (3), with identical hexagonal holes through the center of each, mirrored semicylindrical cavities that combine to form the cavity (3*b*), and which have sets of cylindrical holes arranged in a circle through them. Every second cylindrical hole in top gear (32) is countersunk at the top; corresponding holes not countersunk in top gear (32) are countersunk at the bottom of bottom gear (33). Screws (31) with their head at each countersink are passed through each pair of holes and fastened at the other end with cap nuts (also called "acorn nuts") (34), the acorn-shaped parts of which are the bumps (3*a*) on either side of the entire gear. Prior to the unification of the two gears (32, 33), a ball-and-spring (9) can be placed in each cavity (3*b*); the cavities are unified with the tightening of the cap nuts.

In many if not all embodiments of the invention, the housing about the through-bore gear (3) will consist of two parts (2) and (6), one on either side of this gear, as depicted in FIG. 1, in which case the parts of each interfacing with the gear will need to be kept a constant distance apart; as such, they may contain ribbing and/or bosses (2*c*, 6*c*) such that screws (1*a*, 1*b*, 1*c*, 1*d*) can be placed to hold them together.

It is likely that the housing about the motor's pinion (5) will require screw-holes (8) for the attachment of the motor; it may contain more holes and bosses for attachment to further housing, such as that for any of the motor and its circuit not contained in it.

Figure 5:
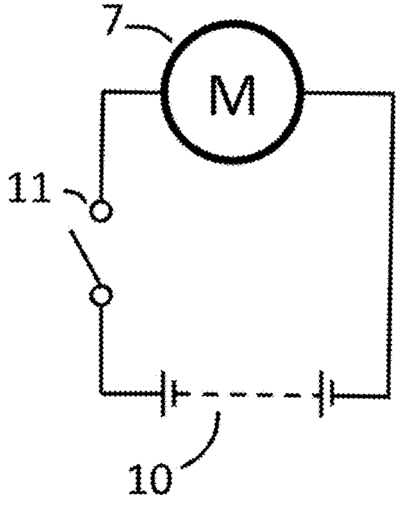
FIG. 5 is a circuit diagram of a simpler embodiment of the electrical portion of the apparatus described herein, including the motor.
Figure 6:
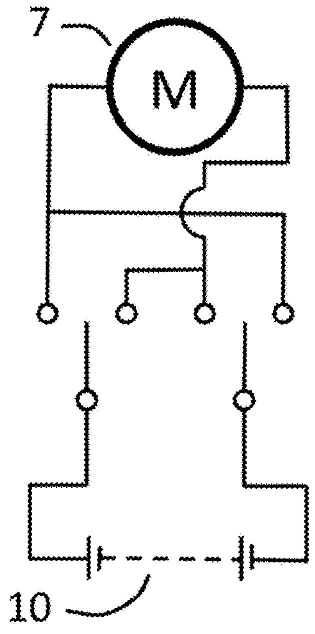
FIG. 6 is a circuit diagram of a more complex embodiment of the same.

In all embodiments of this invention, the motor (7) is connected to a circuit, as depicted in FIGS. 5 and 6. In some embodiments, the circuit may resemble FIG. 5, consisting of the motor (7) in series with a simple interruptor switch (11) and a replaceable power source (10), (e.g., a battery in a battery case, a removable battery, a circuit including a step-down transformer with connection to outlet). In more elaborate embodiments, as in FIG. 6, the switch (11) may be a double-pole, double-throw switch, connected as shown to enable changing the polarity of the voltage applied to the motor (7), reversing the direction of rotation of the mechanism's gears and the threaded fastener it turns, so that it may be run in either direction along the rod without a potentially impossible repositioning of the invention. More elaborate embodiments of the same invention may include mechanisms for power control within the circuit. In most if not all embodiments of the invention, this circuit would be housed as well, in which case the switch (11) would be and the power source (10) would likely be accessible from outside the housing, and the housing may be shaped to act as a handle for easy operation of the tool.

What is being claimed:

1. An apparatus comprising:

a gear with a through-bore hole through an axis of rotation of the gear, an exterior housing configured to enable the gear to rotate but not to translate relative to the housing, a pinion attached to a motor, such that the rotation of the pinion causes rotation of the gear, a power source configured to power the motor, and a switch configured to control the transfer of power from the power source to the motor, wherein the gear further comprises a set of cylindrically symmetrical protrusions, arranged in a circle centered at the axis of rotation, on at least one side, wherein the interior of the housing further comprises an indentation of a circular path of the same diameter as the symmetrical protrusions, and wherein the gear is positioned such that is confined by an interfacing of the symmetrical protrusions with the indentation.

2. A mechanism comprising:

two gears of identical profile in a plane normal to an axis of rotation of the two gears, each with an identical polygonal through-bore containing the axis of rotation and a set of cylindrical through-bores arranged in a circle centered at the axis of rotation, wherein the two gears are held together by screws passed through the corresponding cylindrical through-bores to cap nuts, and wherein the two gears of identical profile, each have at least one semicylindrical cavity formed by a semicircular profile on the polygonal through-bore and a rectangular profile on a face of the gear, wherein when the gears are held together, the semicylindrical cavity of the two gears form a cylindrical cavity in which a ball-and-spring is positioned.

* * * * *